United States Patent [19]
Riddle

[11] Patent Number: 5,405,441
[45] Date of Patent: Apr. 11, 1995

[54] FLY ASH COMPOSITION AND PROCESS FOR MAKING ARTICLES THEREFROM

[75] Inventor: Mitchell S. Riddle, Rio Rancho, N. Mex.

[73] Assignee: Tide Company, Albuquerque, N. Mex.

[21] Appl. No.: 272,740

[22] Filed: Jul. 11, 1994

Related U.S. Application Data

[60] Division of Ser. No. 77,957, Jun. 18, 1993, which is a continuation of Ser. No. 725,312, Jul. 5, 1991, abandoned.

[51] Int. Cl.$^6$ ............................................. C04B 14/00
[52] U.S. Cl. .................................... 106/705; 106/706; 106/708; 106/697; 106/802; 106/811; 106/DIG. 3; 264/DIG. 49; 588/257; 588/255; 52/596
[58] Field of Search ............... 106/705, 706, 708, 792, 106/772, 811, DIG. 3, 697, 802; 264/DIG. 49; 588/257, 255; 52/596

[56] References Cited

U.S. PATENT DOCUMENTS

| | | |
|---|---|---|
| Re. 30,943 | 5/1982 | Nicholson . |
| 2,382,154 | 8/1945 | Jones et al. . |
| 2,576,565 | 11/1951 | Brown . |
| 2,970,060 | 1/1961 | Burnett . |
| 3,962,080 | 6/1976 | Dulin et al. . |
| 4,018,617 | 4/1977 | Nicholson . |
| 4,040,852 | 8/1977 | Jones . |
| 4,143,202 | 3/1979 | Tseng et al. . |
| 4,268,316 | 5/1981 | Wills, Jr. . |
| 4,432,666 | 2/1984 | Frey et al. . |
| 4,432,800 | 2/1984 | Kneller et al. . |
| 4,601,832 | 7/1986 | Hooykaas . |
| 4,624,711 | 11/1986 | Styron . |
| 4,659,385 | 4/1987 | Costopoulos et al. . |
| 4,756,761 | 7/1988 | Philip et al. . |
| 4,780,144 | 10/1988 | Loggers . |
| 4,840,671 | 6/1989 | Lynn et al. . |
| 4,941,772 | 7/1990 | Roesky et al. . |
| 4,997,484 | 3/1991 | Gravitt et al. . |
| 5,040,920 | 8/1991 | Forrester . |
| 5,061,318 | 10/1991 | Casey et al. . |

OTHER PUBLICATIONS

Western Ash Company advertisement (no date).
Western Ash Company, "Waste Treatment: Proven Products for Stabilization/Solidification", Sep. 9, 1988.
Suprenant et al., "Oilcrete", Civil Engineering, Apr., 1990.
Western Ash Company, Summary of Western Ash Company Fly Ash-Stabilization/Solidifiation Projects (no date).
Gehring, Don, "Fly Ash Concrete Provides Solution for Construction of Underground Barrier", CB&E, California Builder & Engineer, Jul. 14, 1986.
Ellingson, David G., "Dam will protect river from acid", ENR, Sep. 10, 1987.
Western Ash Company, "Value Engineering Research: Cost-Effective Strength and Impermeability With Fly Ash" (no date).
Gehring, Don, "Fly ash used in environmental cleanup", Southwest Contractor, Jul., 1990.
Post, Roy G., (Editor), "Waste Isolation in the U.S. Technical Progragms and Public Education", Proceedings of the Symposium on Waste Management at Tucson, Arizona, Mar. 1–5, 1987, pp. 533–537.
Kosmatka et al. "Design & Control of Concrete Mixtures", Thirteenth Edition, 1988, Table 6-1.

*Primary Examiner*—Mark L. Bell
*Assistant Examiner*—Michael Marcheschi
*Attorney, Agent, or Firm*—Cushman Darby & Cushman

[57] ABSTRACT

The present invention relates to a novel composition which is useful for forming construction blocks and encapsulating hazardous materials, a process for producing blocks and encapsulating the material, and blocks made of the material. This composition is a mixture of pozzoulanic fly ash and bottom ash. The weight ratio of fly ash:bottom ash is preferably in the range 80:20% by weight to 20:80% by weight. The process comprises the steps of (a) blending a dry mixture comprising the ash mixture with water; (b) transferring the blended mixture into a compression zone and (c) compressing the blended mixture in the compression zone to form a brick of the desired size.

17 Claims, 11 Drawing Sheets

FLY ASH COMPOSITION AND PROCESS FOR MAKING ARTICLES THEREFROM

This is a division of application Ser. No. 08/077,957, filed Jun. 18, 1993, which is a continuation of application Ser. No. 07/725,312, filed Jul. 5, 1991, now abandoned.

FIELD OF THE INVENTION

The present invention relates to a fly ash composition, a compression/encapsulation process for making products thereof, and products made therefrom. In particular, the present invention relates to a composition and a process for making fly ash blocks. The fly ash blocks are useful as a construction material and for encapsulating hazardous waste.

BACKGROUND OF THE INVENTION

The use of coal for the production of electrical energy has always had an inevitable consequence, the need to dispose of the ash resulting from combustion. Fly ash is a non-toxic waste product which is the result of combustion in coal fired generating facilities. The present invention provides a means of commercializing the ash produced in the combustion process by utilizing the fly ash and bottom ash produced in the coal combustion process to form compressed blocks which are suitable for use as construction materials.

The destruction of waste materials by incineration or combustion has gained favor in the U.S., despite some adverse public opinion. This method of disposal is generally less expensive than alternatives, and reduces the volume of the waste to be disposed. However, several problems exist with current technology. These problems are: (1) heavy metals are not removed and generally remain in the ash; (2) the ash produced is reactive and unmanageable; (3) particulate matter is present in the gas stream; and (4) reactant species in the gas stream may recombine to form toxic substances. The present invention addresses items 1 and 2.

The ash produced by waste incineration generally has a low density. The particles have a high surface area. These properties make disposal of the ash by ordinary means difficult. The high surface area increases chemical reactivity, and if water contacts the ash, it leaches out the heavy metal contaminants. This results in contamination of the water and creates a hazard for living organisms, including man.

The compositions, processes and products of the present invention avoid these problems through the encapsulation of hazardous materials into the fly ash bricks. This disposes of hazardous waste in such a manner as to prevent the hazardous waste from leaching into the environment. The process of present invention incorporates the hazardous materials into blocks formed of the fly ash composition of the present invention. These blocks have advantageous properties and are resistant to leaching.

SUMMARY OF THE INVENTION

The present invention relates to a novel fly ash composition, a process for the production of fly ash body, a process for the encapsulation of hazardous materials, and products made of the fly ash material.

One embodiment of the present invention is a pozzoulanic fly ash composition. Preferably, said composition comprises a mixture of pozzoulanic fly ash and bottom ash. A preferred weight ratio of fly ash to bottom ash in this composition is in the range 80% fly ash:20% bottom ash to 20% fly ash:80% bottom ash. This composition can contain 0 to 20% by volume of desired additives when the composition is used to form construction blocks, or can contain hazardous waste, when used for encapsulation of hazardous waste. The fly ash composition can also be used as a mortar in the construction walls of the brick composition.

An additional embodiment of the present invention is a method for making construction grade bodies of a fly ash material. This process comprises the steps of:

(a) blending a dry material with water, wherein said dry material comprises a pozzoulanic fly ash, preferably mixed with bottom ash;

(b) transferring the blended material into a compression zone, (c) compressing the blended fly ash material to form a fly ash body.

A further embodiment of the presently claimed invention is a method for the encapsulation of hazardous waste. This process comprises inclusion of a hazardous material with the blended dry material in the above process, and then conducting the process to form a fly ash block containing the encapsulated hazardous materials.

A fourth embodiment of the present invention is a fly ash construction block of the present composition.

A fifth embodiment of the present invention is a fly ash construction block which possesses ridges, and an interlocking structure.

DETAILED DESCRIPTION OF THE PRESENT INVENTION

Figure 1:
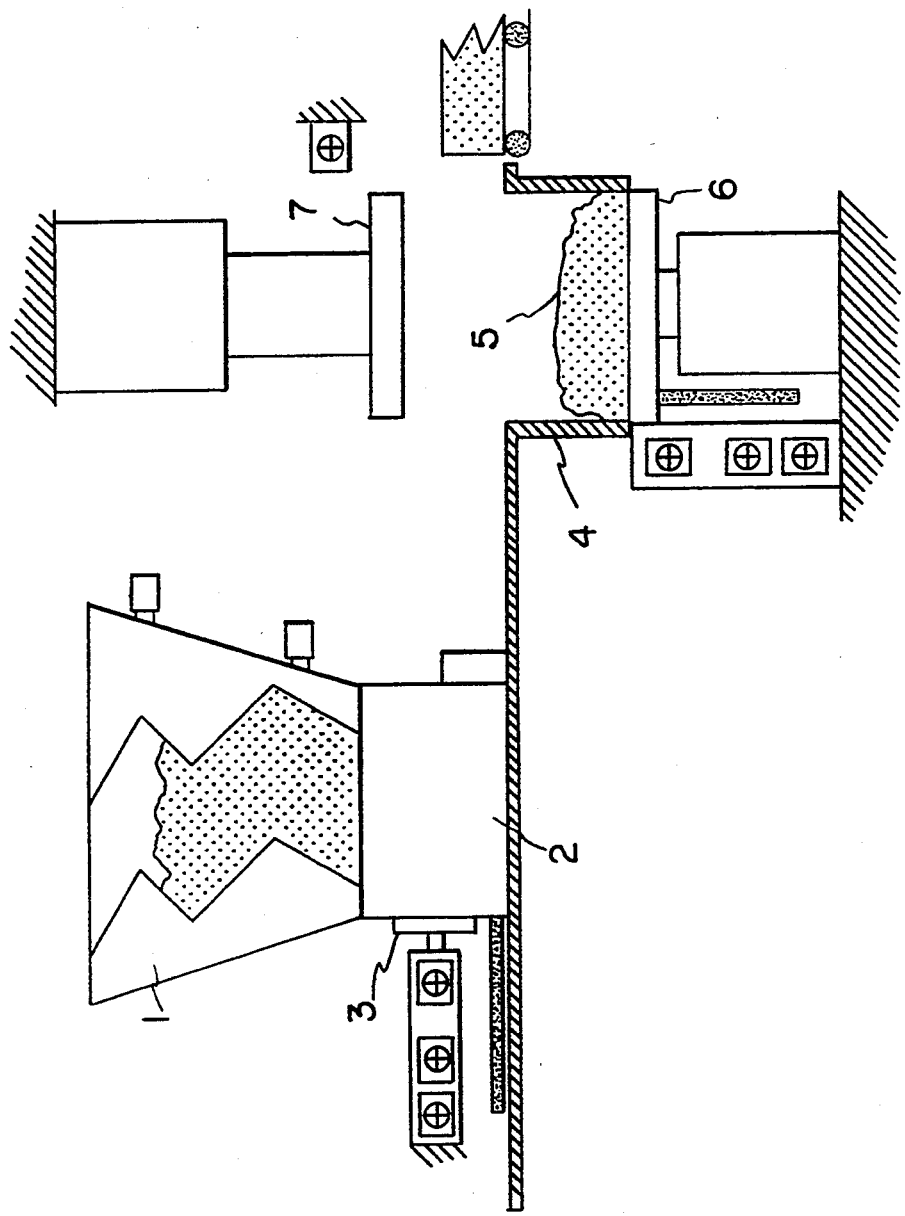
FIG. 1 illustrates the fill stage of the preferred method of conducting the presently claimed process.

When high pressure is applied to a mixture of water, fly ash and, preferably, bottom ash, an accelerated pozzoulanic reaction takes place. The result is a high quality, structurally sound, building material. Building bricks of the highest quality can be fashioned by applying optimum pressure to a combination of ingredients with the correct moisture content.

Fly ash is the ash product which is exhausted through the smoke stack with combustion gases during coal combustion. Bottom ash is the ash which remains in the furnace after coal combustion. Certain grades of fly ash were found to possess pozzoulanic (cement-like) behavior.

One aspect of the present invention is a fly ash composition. This composition is suitable, for example, for forming fly ash construction blocks, encapsulating hazardous materials, and use as a mortar to bond the fly ash blocks together. The present fly ash composition comprises pozzoulanic fly ash. The pozzoulanic fly ash can be used alone, but is preferably combined with bottom ash. The mixture with bottom ash is preferred because bottom ash acts as a less expensive filler, and it serves the same role that aggregate does in normal cement. A preferred pozzoulanic fly ash is C-grade fly ash.

A preferred fly ash to bottom ash weight ratio for the present composition is in the range 80% fly ash:20% bottom ash to 20% fly ash:80% bottom ash. A most preferred weight ratio of fly ash to bottom ash is 50:50.

The present fly ash composition can, in addition, contain 0 to 20% by volume of an additive. The particular additive selected for use is dependent on the specific additional properties which are desired in the construction block. Suitable additives for addition to the fly ash composition include cement, lime, gypsum plaster, polymers, resins, pumice, volcanic ash, sand clay and sand aggregate. The additive is generally present when a specific additional property is desired from the fly ash brick. For example, ordinary cement can be added to the fly ash composition when a longer setting time is desired, as the presence of the cement slows the curing of the fly ash block. Selection of the appropriate additive for a particular special property is within the skill of the art.

The fly ash composition can be formed into construction blocks using the process of the present invention. In addition, the fly ash composition can be used to encapsulate hazardous materials. Construction blocks formed of the present material satisfy all ASTM and UBC requirements for construction materials. The fly ash blocks have extremely high structural strength. The blocks also have high thermal insulation qualities, and extremely good resistance to thermal shock. Thus, the fly ash blocks are excellent for uses where a high degree of insulation is required. These uses include the construction of walls in structures located in areas which have extreme climatic conditions, and use as fire walls. The blocks can withstand repeated freeze/thaw tests while saturated with water without exhibiting any damage. Further, freezing the saturated brick and then thermally shocking it did not cause any defects to appear in the block.

The process of the present invention provides a method of producing blocks made from a combination of fly ash and bottom ash. The blocks which are produced using the present process possess superior properties, and these blocks meet or exceed all American Society for Testing and Materials (ASTM) requirements for structural building brick.

The present process comprises the steps of:
(a) blending a dry material with water, wherein said dry material comprises pozzoulanic fly ash, and preferably comprises a mixture of pozzoulanic fly ash and bottom ash;
(b) transferring the blended material into a compression zone, which is sized such that it contains an appropriate amount of blended material to produce a fly ash body of desired size;
(c) compressing the blended fly ash material to form a fly ash body.

The dry material is made up of the fly ash composition of the present invention, and can include any additives which are suitable for addition to the construction blocks. These additive are added in the amounts noted above with respect to the fly ash composition.

The addition of water triggers the pozzoulanic action (cement like action) of the fly ash in the dry mixture. The pozzoulanic action is the process that binds the ingredients into a solid block. The amount of water which is blended with the dry material varies depending on the ambient temperature and humidity. The amount of water which should be added to the dry material is between a minimum of 10% to a maximum of 20% by weight, relative to the weight of the dry material. If the water content is below 10% by weight, the blend will retain a powdery consistency which will not set properly or compress well. If too much water is added, above 20% by weight, the ingredients will have a muddy consistency and will squeeze through openings in the compression zone. A preferred amount of water is in the range 13 to 15% by weight of the total amount of dry material. A most preferred amount is approximately 14% by weight. Variation in ambient temperature and humidity may require adjustment of the amount of water in order to optimize the brick composition. For example, a lower temperature requires a greater amount of water, to increase lubricity. High temperature, high humidity conditions require the addition of a slightly smaller amounts of water.

Suitable pressure ranges for carrying out the compression step of the present invention are in the range from 1000 to 2500 psi. A preferred pressure range for the compression step is 1500 to 2500 psi. A particularly preferred compression pressure is 1750 psi.

Figure 2:
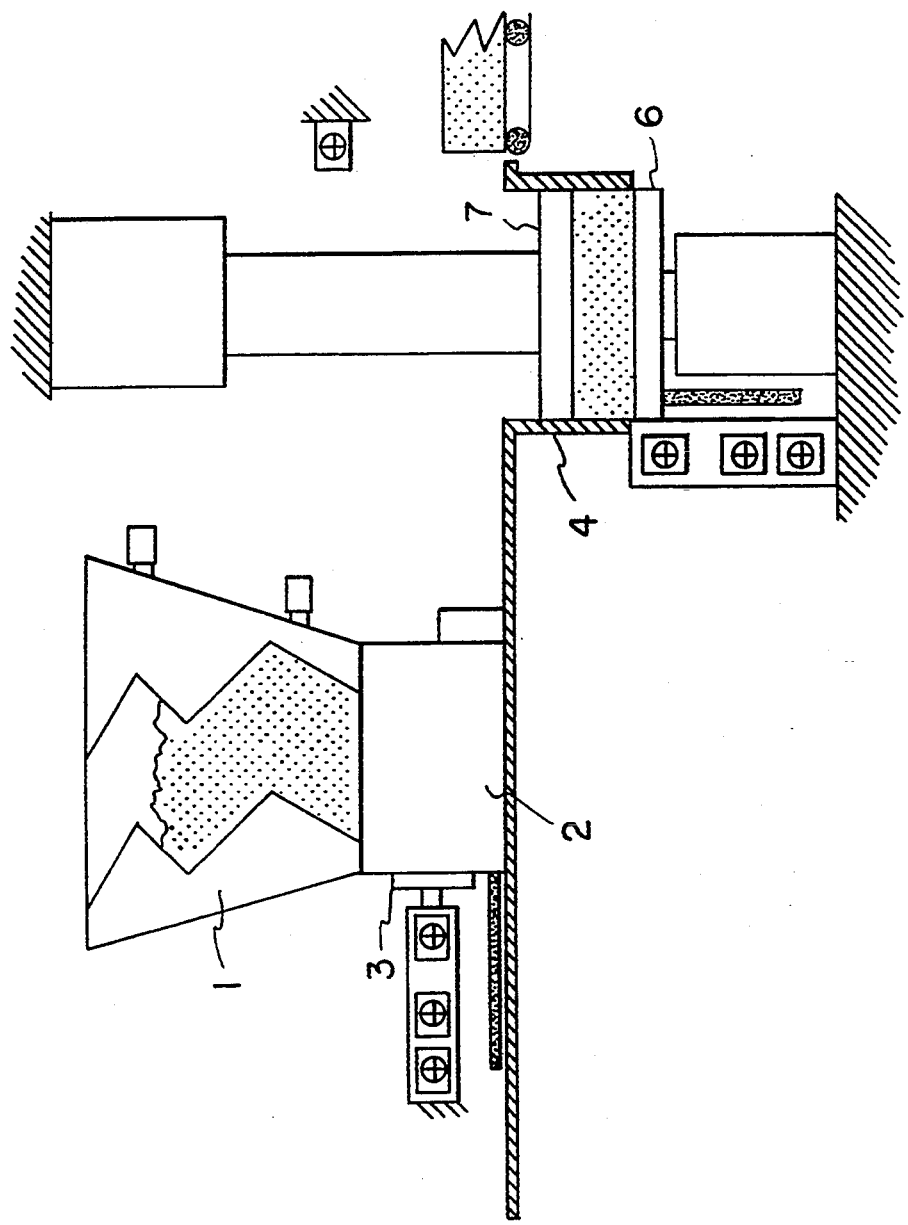
FIG. 2 illustrates the compression stage of the preferred method of conducting the presently claimed process.

An preferred example of the compression zone is the press box of a multiple ram press, as shown in FIGS. 1 and 2.

FIGS. 1 and 2 illustrate a preferred mode of carrying out the present process and are helpful in illustrating the process steps. A preferred mode of carrying out the process of the present invention is as follows:

(1) A dry material is formed of the presently claimed fly ash composition, wherein the fly ash to bottom ash weight ratio is in the range 80% fly ash:20% bottom ash to 20% fly ash:80% bottom ash.

(2) After the dry material is formed, it is blended with water, which is added in an amount which is approximately 14% by weight relative to the total weight of the dry material.

(3) The blended material then transferred to the press box, as shown in FIG. 1. The blended material is deposited into the magazine hopper 1. The magazine hopper 1 feeds the magazine 2 which deposits the blended material 5 into the press box 4 using the magazine ram 3. The amount of ingredients deposited into the press box is dependent on the size of the brick which is to be formed. The press box 4 is appropriately sized so as to contain the correct amount of blended material which is needed in order to produce a block of the desired size.

(4) After the press box is filled, compression is conducted to form the fly ash brick, as shown in FIG. 2. During the compression step, the ejection ram 6, which forms the bottom surface of the press box 4, lowers from the fill position to the fully depressed position. Then the compression ram 7 moves to compress the ingredients in the press box. When maximum psi is reached, the compression ram 7 returns to its start position, and the ejection ram 6 pushes the resulting block out of the press box.

The fly ash blocks are ready for use immediately upon ejection from the production apparatus. Thus, there is no need for an extended curing time. The blocks can cure in the wall or during storage.

The preferred process of present invention can be carried out, for example, by using a multiple ram block machine which produces the fly ash blocks, as illustrated in FIGS. 1 and 2. The apparatus can either be a fixed site facility, or it can be a mobile facility. For example, the apparatus is suitable for mounting of the truck bed of a goose neck flat bed trailer. This allows the device to be taken to the site where the blocks are needed, and allows the fabrication of blocks on site. This type of fabrication reduces the costs of materials transport, as there is no need to transport finished blocks. Between six and seven blocks per minute can be produced by this apparatus, and blocks which are produced using the machinery are ready for immediate use. A suitable apparatus for use with the present material and in the present processes is disclosed in the co-pending application by the present inventor, which has been assigned Ser. No. 07/725,313, now abandon. The contents of this co-pending application are hereby incorporated by reference.

An additional embodiment of the present invention is a process for the encapsulation of hazardous materials. This encapsulation process is a modification of the above described process for making fly ash blocks. In the encapsulation process, a hazardous material is blended with the fly ash material to form the dry material.

The present encapsulation process provides a low cost and easily managed method for disposal of a variety of hazardous waste materials. Any type of waste which can be successfully incorporated into the fly ash block is suitable for use in the present encapsulation process. Specific, non-limiting, examples of hazardous materials which are suitable for use in the present encapsulation process include asbestos, contaminated soils, pesticides, herbicides or other toxic or hazardous chemical compounds, petroleum waste products, PCB contaminants, low yield radioactive waste, acids, medical ash, municipal solid wastes, incinerator ash, heavy metals and gasification plant ash.

The maximum amount of hazardous waste which can be encapsulated in the block varies as a function of the waste material. Encapsulation formulas vary from as little as 25% C-grade fly ash up to 50% c-grade fly ash, depending on the materials to be encapsulated. In addition, bottom ash can be added in order to increase brick integrity. These conditions are controlled by the standards and conditions imposed by the circumstances in which the brick is used. For example, medical ash can be encapsulated in an amount as large as 75% by weight, without impairing the structural integrity of the brick. Other types of waste, such as oils and petroleum products, can be encapsulated at a much lower amount, for example in the range 10 to 20% by weight. Different hazardous materials produce different effects on the strength of the brick. The amount of waste product encapsulated should not be high enough to affect the structural integrity of the block. This amount can be determined by those skilled in the art without undue experimentation for the particular hazardous material which is to be encapsulated.

The blocks which contain the encapsulated hazardous material are ideally suited for hazardous material disposal, as they are high strength, are long lasting, and have low leach rates. Thus, the hazardous materials which are encapsulated in the fly ash composition will not leach out into the ground water. The blocks are also high strength and have a long life span, on the order of 2000 years. Further, the use of blocks to contain the encapsulated hazardous waste places the waste in a form which is easy to handle, and reduces the total volume of waste which is disposed. This eases land fill congestion and provides an reliable method of hazardous disposal.

Blocks containing the encapsulated hazardous waste can be disposed of in land fills, or can be used in suitable construction projects, such as erosion control walls, levees, breakwaters, etc. When these blocks are disposed of in land fills, a layer of the fly ash blocks of the present invention can be placed below the contaminated blocks as an additional liner.

Figure 7:
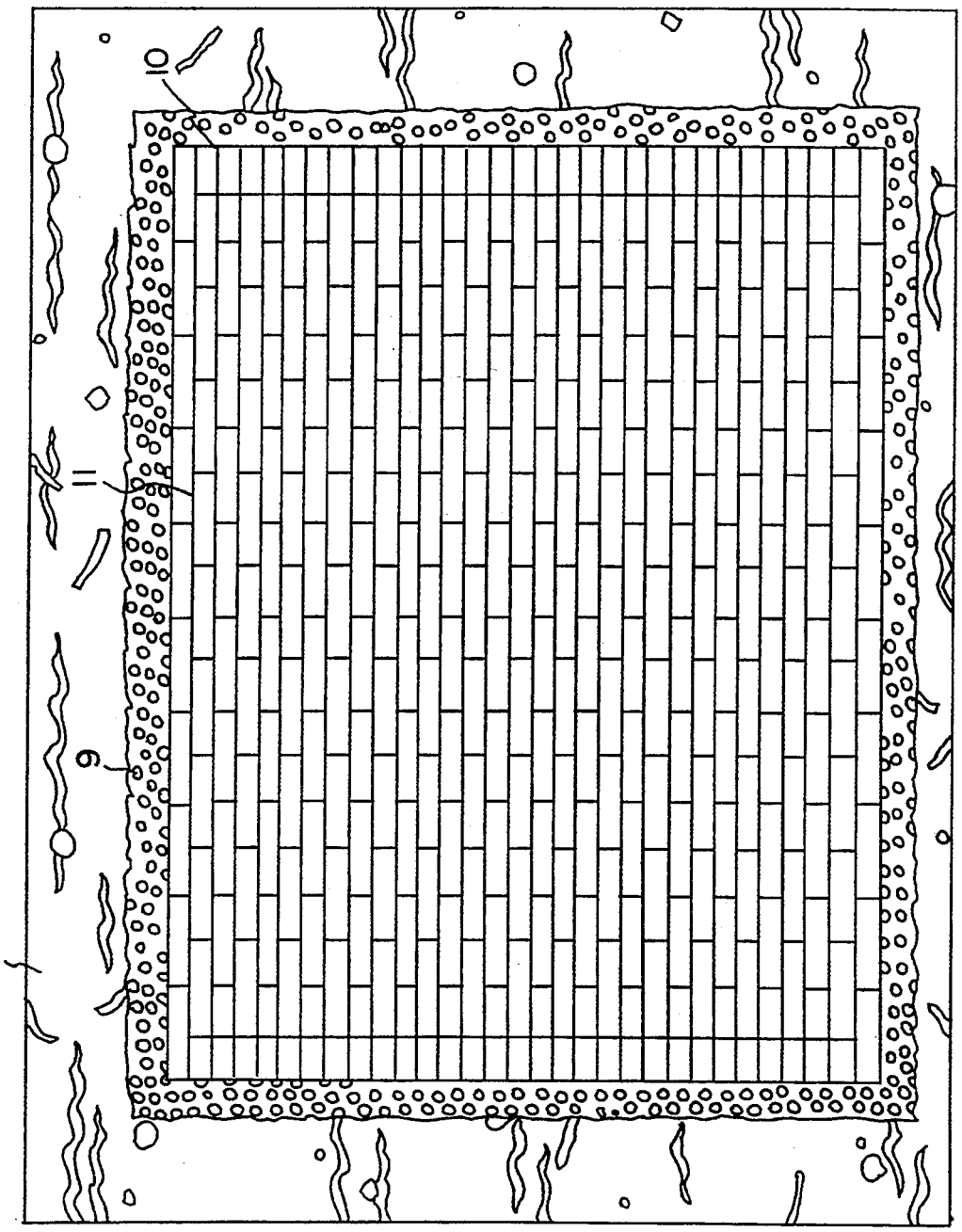
FIG. 7 illustrates the use of the present invention in a landfill to encapsulate hazardous waste.
Figure 8:
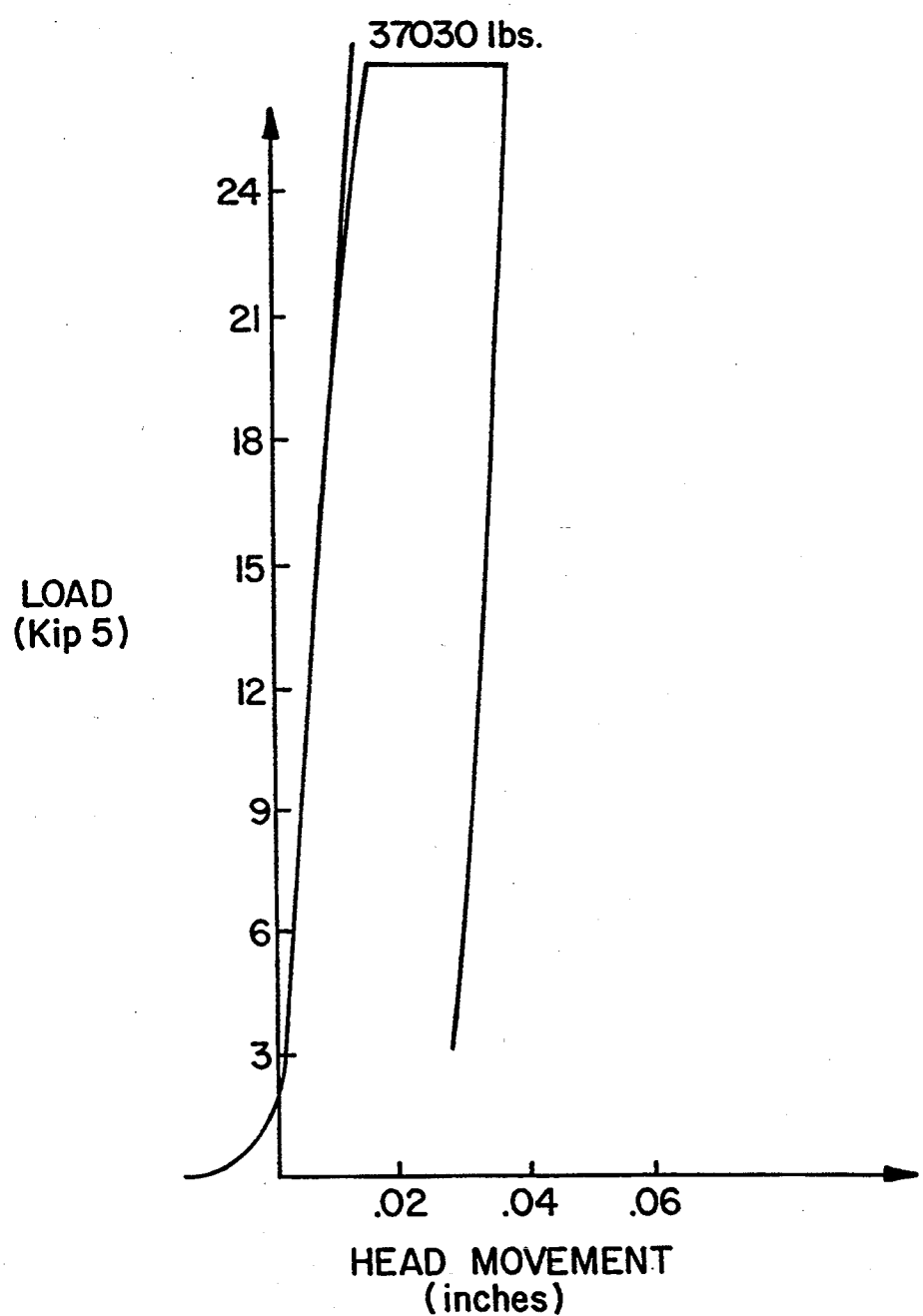
FIGS. 8 to 11 show the graphical results of compressive strength tests for blocks which were formed by compressing the fly ash composition after allowing it to set for a certain time period.
Figure 9:
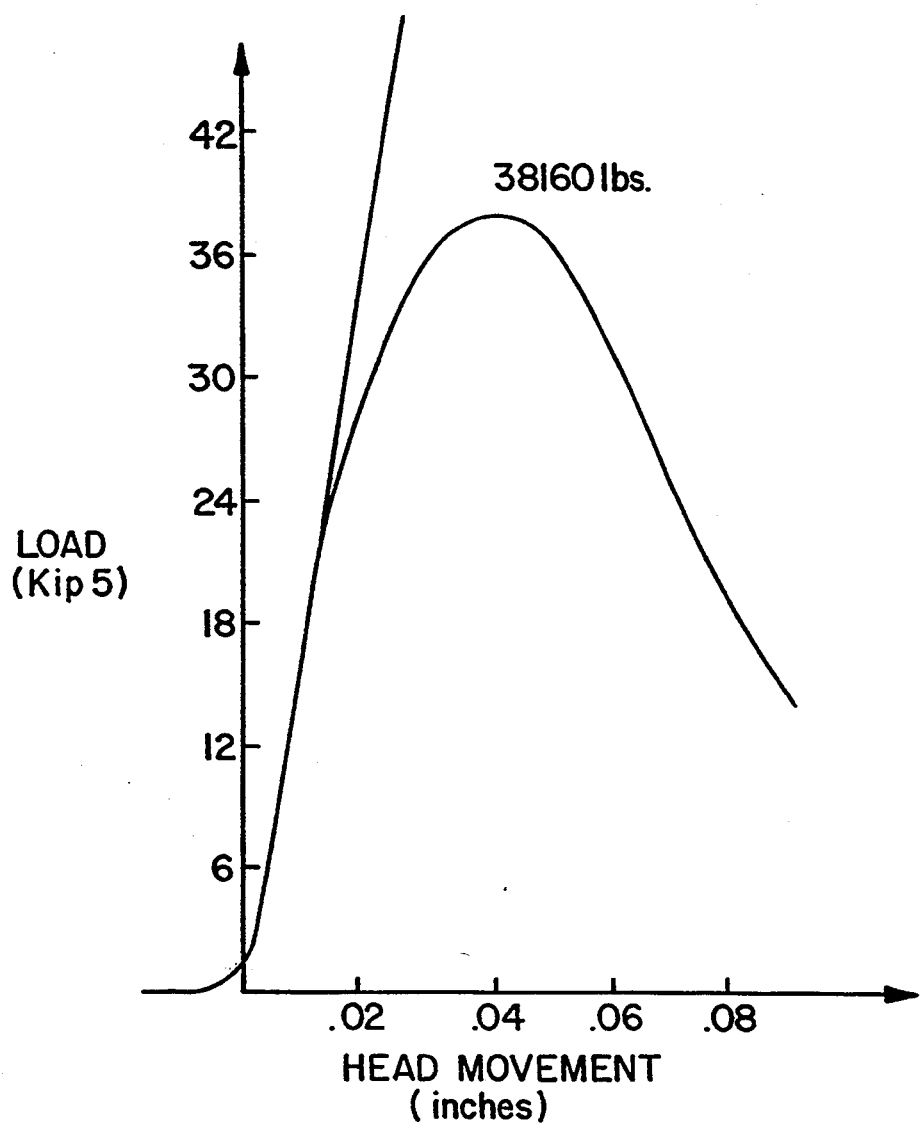
Figure 10:
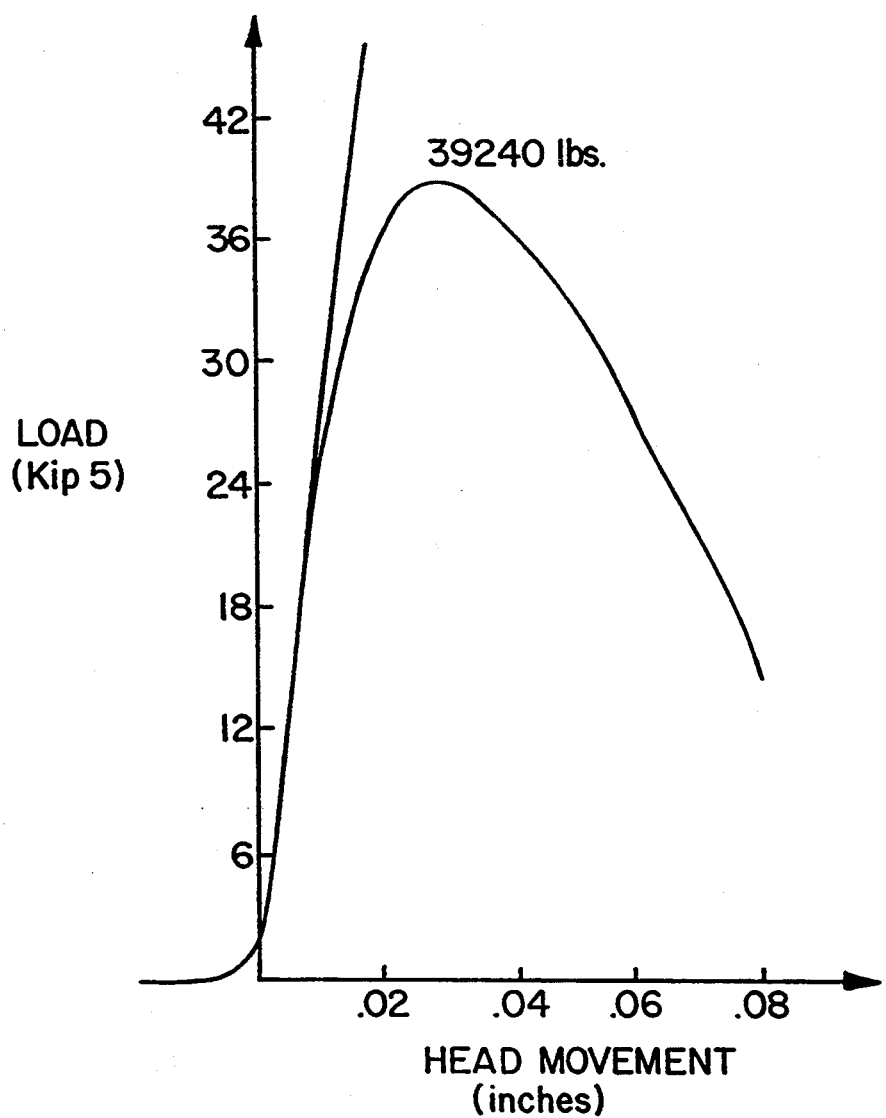
Figure 11:
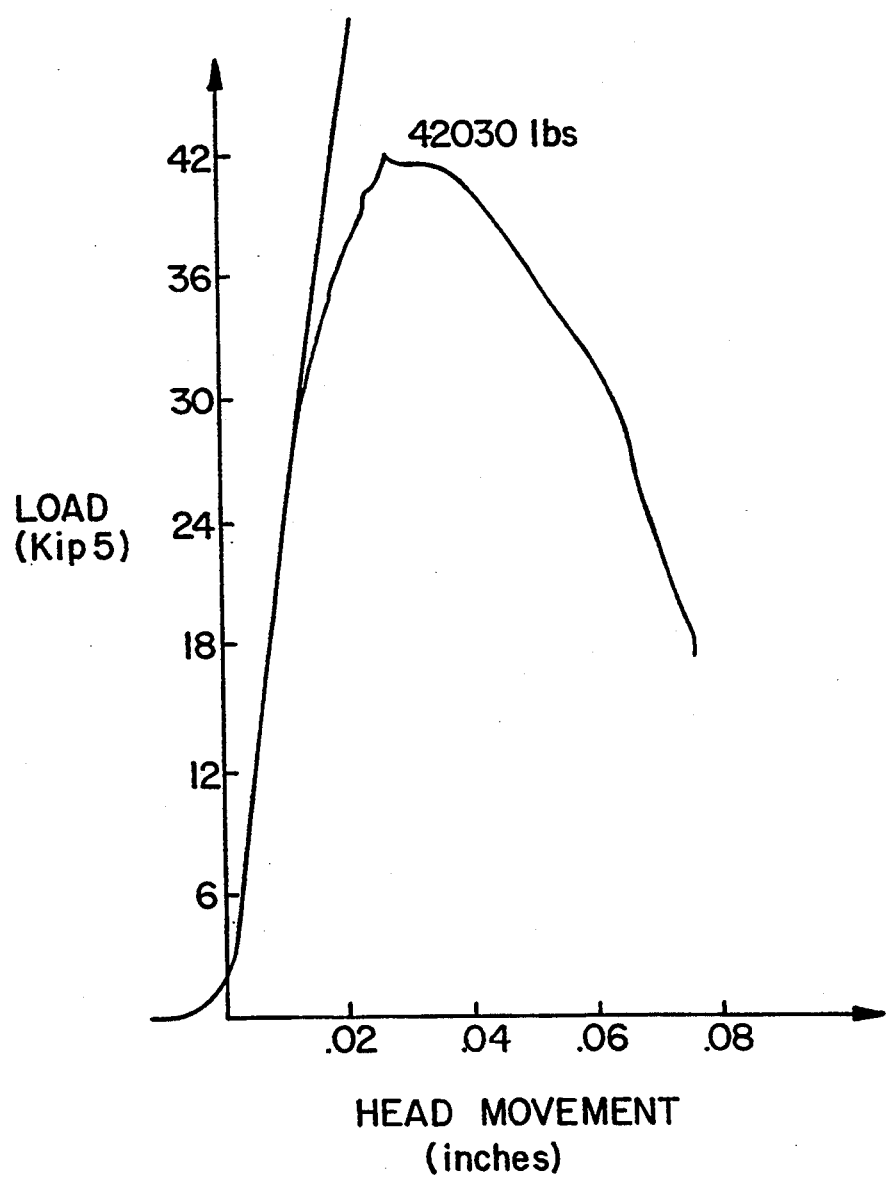

FIG. 7 illustrates an example of a type of land-fill disposal for the encapsulated hazardous materials. A layer of fly ash/bottom ash slurry is 9 placed on the bottom and sides of a hole. A layer of uncontaminated brick 10 is then placed as a lining. Finally, the contaminated bricks 11 are filled into the middle, covered with a layer of uncontaminated fly ash brick 10 and sealed with a fly ash/bottom ash slurry 9.

When low grade radioactive waste is the encapsulated hazardous material, the encapsulation process comprises an additional step. In this step, a fly ash composition is heated to a temperature sufficient to liquify it. This temperature is approximately 1400° C. The fly ash block containing the encapsulated radioactive material is then dipped into the liquefied ash composition. The liquified ash composition coats the outside of the block, and forms a glass coating layer on the outside of the block. Preliminary results show that this glass layer is impervious to radiation. Thus, the glass layer should prevent radiation from the encapsulated waste from escaping into the environment.

Figure 3:
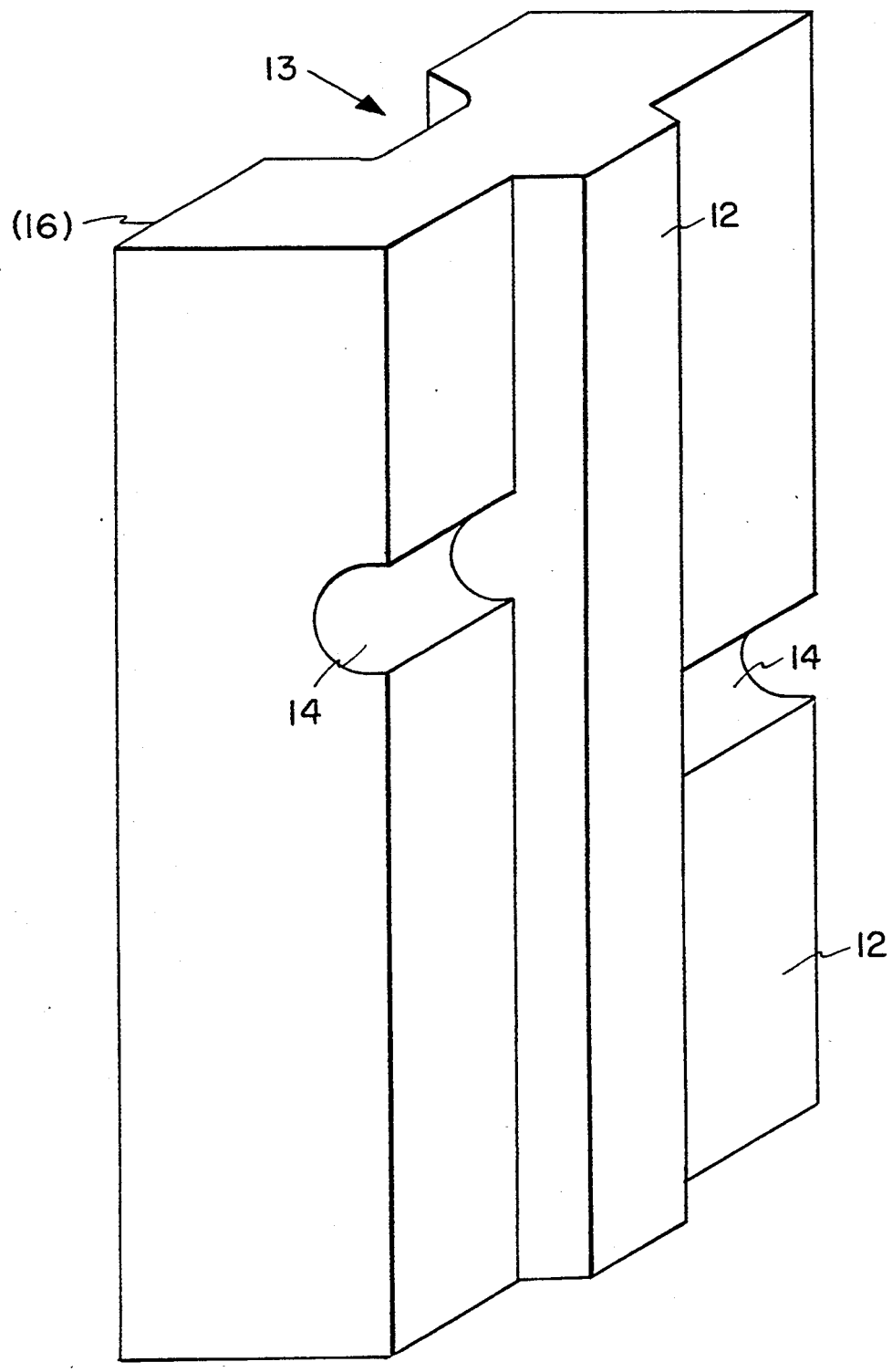
FIG. 3 illustrates an interlocking fly ash block.

A further embodiment of the present invention is a contoured block made up of the fly ash material. Two types of contoured blocks can be formed, the standard contoured block is illustrated in FIG. 3. The contoured block contains a ridge 12 which is located down the center axis of the top face of the block 15. A groove 13 which is the same shape as the ridge is located in the center portion of the bottom face, directly below ridge 12. The contoured brick is designed so that when the bricks are used to construct a wall, ridge 12 interlocks with groove 13 on the block above it. The groove 13 is slightly larger than ridge 12 in order to provide a gap therebetween for mortar, which can be injected into the gap through grooves 14.

Figure 4:
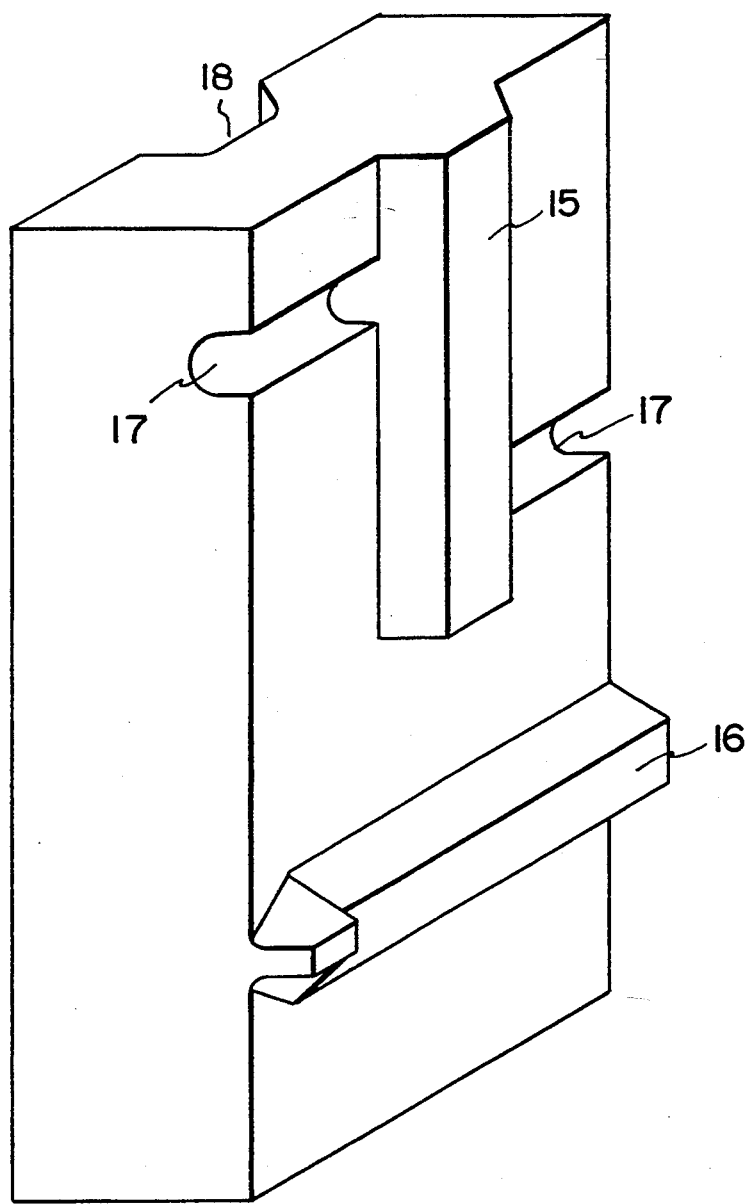
FIG. 4 illustrates an interlocking corner block.

FIG. 4 illustrates a corner contoured block. The corner contoured block has the advantage that it provides a double interlock feature; ridges 15 and 16, on the top face, and grooves 18 and 19 on the bottom face. The contours located on the corner brick interlock the adjoining bricks in both walls. As with the contoured brick shown in FIG. 3, the grooves 18 and 19 are slightly larger than the ridges 15 and 16 in order to provide a gap therebetween for mortar, which can be injected into the gap through the grooves 17.

This interlocking groove system at the corner provides superior bonded and structural strength and provides earthquake resistance due to the double interlock feature. In addition, these blocks can be bonded into a structure using a mortar which is made up of the present fly ash composition. This allows the construction of structures with high tensile strength, because the composition of the wall is homogenous.

The following examples are intended as illustrations of the use of the present invention but are not deemed to limit the scope of the presently claimed invention.

EXAMPLE 1

A standard fly ash brick 15 lbs of bottom ash and 15 lbs of C-grade fly ash were mixed together. 4.2 lbs of water (14% of the total weight of the dry composition) was blended into the dry fly ash/bottom ash mixture. The resulting blended mixture was placed into a press box and was compressed to form a block using a maximum pressure of 1750 psi.

EXAMPLE 2

Encapsulation of Medical Ash

A fly ash block was formed of 25% C-grade ash and 75% medical waste ash. The dry material was blended with water which was added in an amount which was 12% of the combined weight of the dry ingredients. The blended material was placed in a press box and was compressed to form a block using a maximum pressure of 1750 psi.

The water content added was slightly less than that added to the structural brick in Example 1, as the medical ash is highly absorbent, and as a result, less water is required to optimize compactibility. The compaction rate was 60% of the free fall volume.

EXAMPLE 3

Encapsulation of Municipal Solid Waste

A fly ash block was formed of 25% C-grade ash and 75% municipal solid waste ash. The dry material was blended with water which was added in an amount which was 14% of the combined weight of the dry ingredients. The blended mixture was placed in a press box and compressed to form a brick using a maximum pressure of 1750 psi. The compaction rate was 50% of the free fall volume.

EXAMPLE 4

Encapsulation of Oils Suspended in a Medium, such as dirt, powder, Cinders, etc.

A fly ash block was formed of 33% C-grade ash and 15% oil and 52% of a suspension medium. The oil was mixed with the suspension medium, which can include dirt, powder, cinders, lime, etc. The resulting mixture of oil and suspension medium was mixed with the C-grade fly ash. The dry material was blended with water which was added in an amount which was 14% of the combined weight of the dry ingredients. The blended mixture was placed in a press box and compressed to form a brick using a maximum pressure of 1750 psi.

The compaction rate of the blocks formed of this material is dependent on the suspension medium. For example, when lime is used as the suspension agent, and PCB's are used as the oil in the above percentages, the compaction rate is 45%.

EXAMPLES 5 TO 15, COMPARATIVE EXAMPLES 1 TO 4

Fly ash blocks of the present invention (Examples 5 to 15) were formed using a fly ash/bottom ash ratio as shown in Table 1. In table 1, PA is Pawnee Ash, which is C-grade fly ash obtained from the Pawnee Electrical Generating Plant, CA is Comanche Ash, which is C-grade fly ash obtained from the Comanche Electrical Generating Plant. These compositions were blended with water in an amount of 15% by weight. The blended mixture was placed in a press box and compressed to form a brick using a maximum pressure of 1750 psi. The thickness, compressive strength, modulus of rupture, and final moisture content of the bricks is shown in Table 1.

Comparative examples 1 to 4 contain red clay or sand clay in addition to the fly ash and bottom ash. These bricks contain 25% fly ash by weight, 25% bottom ash by weight, and 50% by weight of yellow or red clay. These dry materials were also blended with water in an amount of 15% by weight, and compressed as above.

The same properties which were tested for the bricks of the present invention were also tested for the other bricks. These bricks displayed lower compressive strengths and modulus of rupture, overall, then those observed for the bricks made of the present materials.

TABLE 1

| | | Examples 5–15 Cast Into 10" × 14" Bricks | | | | |
|---|---|---|---|---|---|---|
| Example No. | INGREDIENTS Measured by Volume | Thickness (Inches) | Compressive Strength (psi @ 12 days) | Modulus of Rupture (psi @ 10 days) | Moisture Content (% of dry wt.) | COMMENTS |
| 5 | ½ PA, ½ BA | 3.45 | 2965 | 172 | 2.7 | |
| 6 | ½ PA, ½ BA | 4.12 | 2685 | 47 | 3.6 | added water |
| 7 | ½ PA, ½ BA | 3.65 | 1920 | 291 | 4.1 | #3 & #4 - same amount of water |
| 8 | ½ PA, ½ BA | 4.05 | 5050 | 258 | 7.5 | #4 would have been a little dry as it set a few minutes longer. |
| 9 | ½ CA, ½ BA | 3.64 | 2950 | 384 | 4.8 | |
| 10 | ½ CA, ½ BA | 3.75 | 2920 | 340 | 4.7 | mix set 3 to 5 min. longer and got dryer. |
| 11 | ¼ CA, ¾ BA | 3.50 | 2655 | 178 | 3.9 | |
| 12 | ¾ CA, ¼ BA | 3.45 | 3125 | 173 | 3.3 | |
| 13 | ¼ PA, ¾ BA | 4.22 | 2495 | 215 | 3.6 | |
| 14 | ¾ PA, ¼ BA | 2.75 | 3170 | 265 | 4.0 | |
| 15 | 100% PA | 3.45 | 3520 | 328 | 6.4 | |
| Comp. Ex. 1 | ¼ PA, ¼ BA, ½ red clay | 3.86 | 1970 | 9 | 5.1 | |
| Comp. Ex. 2 | ¼ CA, ¼ BA, ½ red clay | 3.95 | 1400 | 95 | 4.2 | |
| Comp. Ex. 3 | ¼ CA, ¼ BA, ½ yellow sand clay | 3.66 | 1000 | 51 | 3.6 | |
| Comp. Ex. | ¼ PA, ¼ BA, | 3.69 | 1300 | 39 | 4.4 | |

TABLE 1-continued

Examples 5-15
Cast Into 10" × 14" Bricks

| Example No. | INGREDIENTS Measured by Volume | Thickness (Inches) | Compressive Strength (psi @ 12 days) | Modulus of Rupture (psi) @ 10 days | Moisture Content (% of dry wt.) | COMMENTS |
| --- | --- | --- | --- | --- | --- | --- |
| 4 | ½ yellow sand clay | | | | | |

PA - Pawnee ash
CA - Comanche ash
BA - Bottom ash

EXAMPLE 16

Figure 5:
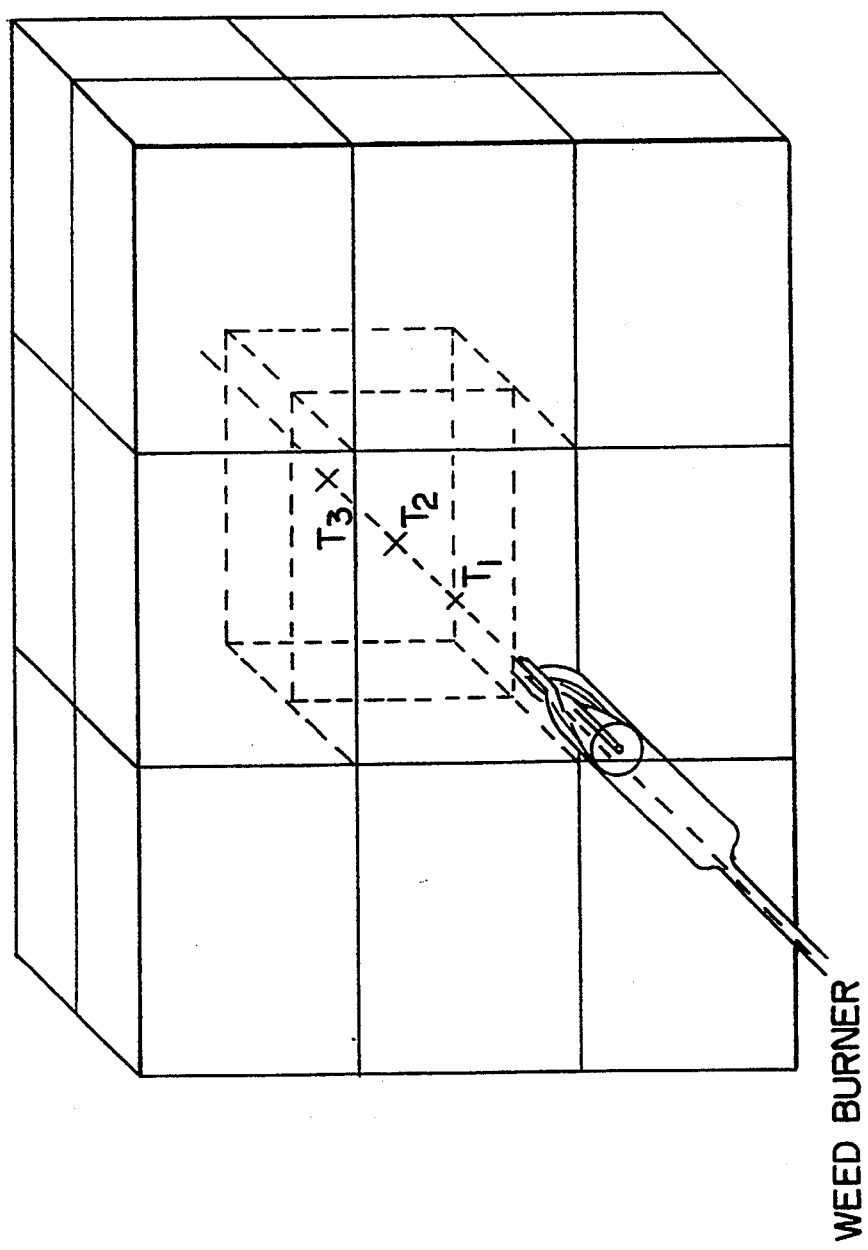
FIG. 5 illustrates the experimental set up which was used in Example 16.
Figure 6:
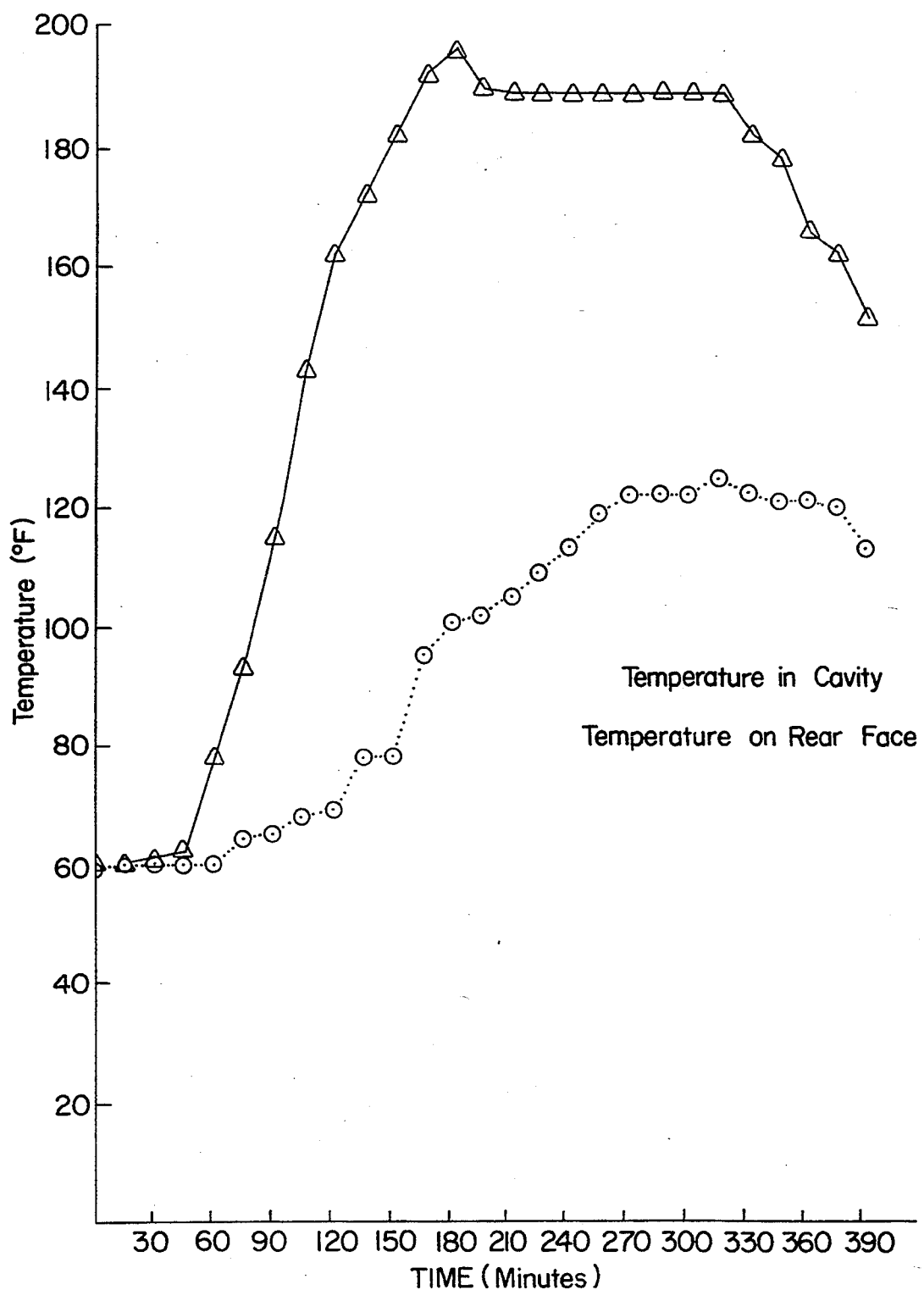
FIG. 6 illustrates graphically, the results of the thermal resistance test from Example 16.

The heat flow characteristics of the blocks formed of the present composition were tested. The fly ash blocks were made from the following composition: 28% Comanche C-grade fly ash, 30% of a mixture of F-grade fly ash and bottom ash (15% each F-grade fly ash and bottom ash) and 42% bottom ash. 15% water by weight was blended with the dry material, and it was compressed into bricks at 1750 psi. The test procedure consisted of mortaring 4 inch thick bricks to form the structure which is shown in FIG. 5. Type K Chromel-acumel thermocouples were cemented in the cavity, on the rear, and in the frame. A weed burner connected to the outlet of a 250 lb propane tank was positioned as shown in FIG. 5. The burner face was six inches from the block assembly face. The results of the test are shown in Table 2, and are depicted graphically in FIG. 6. The burner was run for 3 hours, and the temperatures were measured. After 3 hours, the burner was turned off and the temperature was measured for another 3 hours. The flame temperature was 2000° F.

The temperature in the cavity was raised 120 degrees over a 3 hour period. After the flame was turned off, the temperature dropped slightly, and then remained relatively constant at around 190° F. for 2 hours before slowly tapering off.

The temperature at the rear face of the block wall was raised 40 degrees while the burner was operated, and went up another 20 degrees.

No evidence of spalling, cracking, checking or other form of deterioration was observed on the bricks. In addition, not only did the material display excellent resistance to heat gain, but also demonstrated slow heat release properties, which would suggest potential utility as a heat storage medium.

TABLE 2

| Time (min) | Flame | Cavity | Temperature (F) Rear Face | Observations |
| --- | --- | --- | --- | --- |
| 0 | 2000 | 0 | 0 | |
| 15 | 2000 | 60 | 60 | |
| 30 | 2000 | 61 | 60 | |
| 45 | 2000 | 62 | 60 | |
| 60 (1 hr) | 2000 | 78 | 60 | |
| 75 | 2000 | 93 | 64 | |
| 90 | 2000 | 115 | 65 | |
| 105 | 2000 | 143 | 68 | |
| 120 (2 hr) | 2000 | 162 | 69 | |
| 135 | 2000 | 172 | 78 | |
| 150 | 2000 | 182 | 78 | Changed Chart Paper |
| 165 | 2000 | 192 | 95 | |
| 180 (3 hr) | 2000 | 196 | 101 | |
| 188 | 2000 | 190 | 102 | Start Cool-Down |
| 195 | 0 | 189 | 105 | |
| 210 | 0 | 189 | 109 | |
| 225 | 0 | 189 | 113 | |
| 240 (4 hr) | 0 | 189 | 119 | |
| 255 | 0 | 189 | 122 | |
| 270 | 0 | 189 | 122 | |
| 285 | 0 | 189 | 122 | |
| 300 (5 hr) | 0 | 189 | 125 | |
| 315 | 0 | 182 | 122 | |
| 330 | 0 | 178 | 121 | |
| 345 | 0 | 166 | 121 | |
| 360 (6 hr) | 0 | 162 | 120 | |
| 375 | 0 | 152 | 113 | |

EXAMPLE 17 & COMPARATIVE EXAMPLE 5

The shearing strength of the fly ash blocks of Example 16 was determined. This was compared to the shearing strength of slump blocks which were bonded using Portland Cement Mortar (Comparative Example 5). The fly ash blocks were bonded using a fly ash mortar composition which had the same fly ash:bottom ash ratio as the block. The loading was applied to an assembly of 4 blocks vertically, which were bonded using three joints. The loading was applied to the blocks while they were oriented with the mortar joints parallel to the direction of loading. The two outside blocks were supported on the underside by wooden spacers having a width and length which fully supported each block. The loading was applied across the full width of the center two blocks, imposing shear loading on two mortar joints. The keyed section of the fly ash blocks was oriented in the vertical direction.

The results are shown in table 3.

Table 3

Example 17
Bonded Surface area of each joint: 147.26 square inches
Applied loading: 9,220 lbs
Shearing stress: 31.3 psi
Comparative Example 5
Bonded Surface area of each joint: 60 square inches
Applied loading: 2,900 lbs
Shearing stress: 24.1 psi

EXAMPLE 18

The effect of delay in undertaking the compression step of the present invention was observed. 33% by weight C-grade fly ash, 33% by weight bottom ash; and 33% by weight wood ash (waste product) were mixed together to form a dry mixture. Water was added to this dry mixture in an amount of 14% by weight. The resulting blended mixture was formed into four blocks, by placing successive amounts of the blended mixture into a press box, and compressing the material under a 1750 psi maximum load. The formation of the bricks was conducted at an ambient temperature of 72° F. The compressive strength of each block was determined, and the plots of this test are shown in FIGS. 8 to 11, for blocks 1 to 4 respectively.

Block 1 was compressed approximately 1 minute after the dry mixture was blended with water. Block 2 was compressed approximately 2 and ½ to 3 minutes after mixing with water. Block 3 was compressed approximately 5 to 6 minutes after blending with water. Block 4 was blended 9 to 10 minutes after blending with water.

It was found that the compressive strength of the blocks increased when the mixture was subjected to a longer setting time in the magazine hopper, prior to compression into the brick. This is of course, limited by the fact that excessive delay (much more than 10 minutes) will allow the material to quickset, and will result in a nonusable powdery material. The results of this test are shown in Table 4.

TABLE 4

| Block | Set time (min) | Compressive Strength (psi) |
| --- | --- | --- |
| 1 | 1 | 3050 |
| 2 | 2.5–3 | 3143 |
| 3 | 5–6 | 3232 |
| 4 | 8–9 | 3462 |

What is claimed:

1. A fly ash block prepared by:
   (a) blending a dry material with water, wherein said dry material comprises pozzolanic fly ash;
   (b) transferring the blended material to a compression zone, which is sized such that it contains an amount of blended material to produce a fly ash block; and
   (c) compressing the blended material at a pressure of 1000 to 2500 psi to form the fly ash block.

2. A fly ash block prepared by:
   (a) blending a dry material with water, wherein the dry material comprises pozzolanic fly ash and bottom ash;
   (b) transferring the blended material to a compression zone, which is sized such that it contains an amount of blended material to produce a fly ash block; and
   (c) compressing the blended material at a pressure of 1000 to 2500 psi to form the fly ash block.

3. A fly ash block according to claim 1 or 2, said block possessing a ridge on a face of the block, and a groove a different face of the block, wherein the face containing the groove is located on the opposite side of the block from the face with the ridge;
   wherein the ridge is located in the center of the face, and extends the full length of center axis of the block, and the groove is substantially identical in shape to the ridge, and is located in substantially the same relative orientation on the face opposite to that which the ridge is located on,
   further, said block contains a pair of small grooves in the face containing the ridge, said small grooves being oriented perpendicularly to the ridge, and running from the edge of the block to the ridge, and one of each of said small grooves being located on opposite sides of the ridge.

4. A fly ash block according to claim 1 or 2, said block possessing two ridges on a face of the block, and two grooves on a different face of the block, wherein the face containing the grooves is located on the opposite side of the block from the face with the ridge;
   wherein a first ridge is located on the center axis of the face, and extends approximately ½ the length of the center axis of the block, and a second ridge is located in said face and is oriented perpendicularly to the first ridge, the second ridge extending from one edge of the brick substantially to the other edge of the bridge, and being locate approximately half way between the end of the first ridge and the end of the block,
   wherein the grooves are substantially identical in shape to the ridges, and are located in substantially the same relative orientation on the face opposite to that which the ridge is located on,
   further, said block contains a pair of small grooves in the face containing the ridge, said small grooves being oriented perpendicularly to the first ridge, and running from the edge of the block to the ridge, and one of each of said small grooves being located on opposite sides of the ridge.

5. The fly ash block of claim 1, wherein the pozzolanic ash is C-grade fly ash.

6. A fly ash block produced by:
   (a) blending a dry material with water, wherein the dry material comprises a mixture of pozzolanic fly ash and an additive comprising lime, gypsum plaster, polymers, resins, volcanic ash, clay, or aggregate;
   (b) transferring the blended material to a compression zone, which is sized such that it contains an amount of blended material to produce a fly ash block; and
   (c) compressing the blended material at a pressure of 1000 to 2500 psi to form the fly ash block.

7. The fly ash block of claim 6, wherein said additive is present in an amount up to 20% by volume of the total dry composition.

8. A fly ash block prepared by:
   (a) blending a dry material with water, wherein the dry material comprises a mixture of pozzolanic fly ash and a hazardous material to be encapsulated in the fly ash body;
   (b) transferring the blended material to a compression zone, which is sized such that it contains an amount of blended material to produce a fly ash block; and
   (c) compressing the blended material at a pressure of 1000 to 2500 psi to form the fly ash block.

9. The fly ash block of claim 8, wherein the hazardous material comprises asbestos, contaminated soils, pesticides, herbicides, petroleum waste products, PCB contaminants, low yield radioactive waste, acids, medical ash, municipal solid wastes, incinerator ash, or gasification plant ash.

10. A fly ash block prepared by:
    (a) blending a dry material with water, wherein the dry material comprises a mixture of pozzolanic fly ash and a hazardous material to be encapsulated in the fly ash block, wherein the hazardous material is low yield radioactive waste;
    (b) transferring the blended material to a compression zone, which is sized such that it contains an amount of blended material to produce a fly ash block;
    (c) compressing the blended material at a pressure of 1000 to 2500 psi to form the fly ash block;
    (d) heating a pozzolanic fly ash/bottom ash mixture to a temperature sufficient to liquify the fly ash/bottom ash mixture; and
    (e) dipping the fly ash block into the liquified mixture, so as to provide a fly ash glass coating on the exterior surface of the fly ash block.

11. The fly ash block of claim 2, wherein the weight ratio of pozzolanic fly ash to bottom ash is in the range 20% fly ash:80% bottom ash to 80% fly ash:20% bottom ash.

12. The fly ash block of claim 11, wherein the ratio of pozzolanic fly ash to bottom ash is 50:50.

13. The fly ash block of claim 1, wherein said compression step is achieved using a compression ram.

14. The fly ash block of claim 1, wherein the amount of water added to the dry material to form the blended material is in the range 10 to 20% by weight relative to the total weight of the dry material.

15. The fly ash block of claim 14, wherein the amount of water added to the dry material is in the range 13 to 15% by weight relative to the total weight of the dry material.

16. The fly ash block of claim 15, wherein the amount of water added to the dry material is 14% by weight of the dry material.

17. A fly ash block prepared by:
(a) forming a dry material comprising pozzolanic fly ash and bottom ash, wherein the fly ash to bottom ash ratio is in the range 80% fly ash:20% bottom ash to 20% fly ash:80% bottom ash, by weight;
(b) blending the dry material with water, which is added in an amount which is approximately 14% by weight relative to the total weight of the dry material;
(c) transferring the blended material to a press box, wherein the amount of blended material which is transferred into the press box is dependent on the size of the fly ash block which is to be formed, and the press box is sized so as to contain the correct amount of blended material which is needed in order to produce a block; and
(d) compressing the blended material at a pressure of 1500 to 2500 psi in the press box in order to form the fly ash block.

* * * * *